No. 614,548. Patented Nov. 22, 1898.
C. A. HENNICKE.
GEARING.
(Application filed Apr. 13, 1898.)
(No Model.)
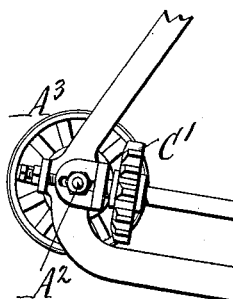
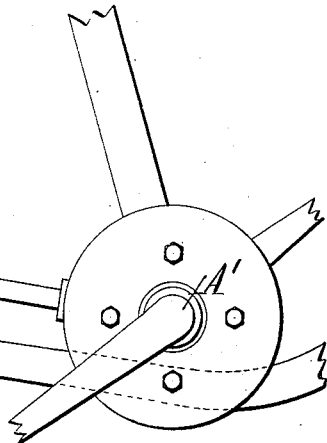
Fig. 1.
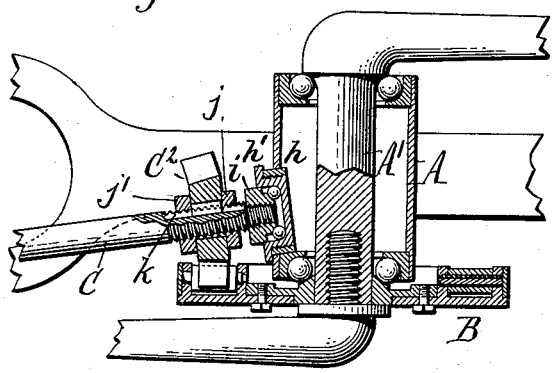
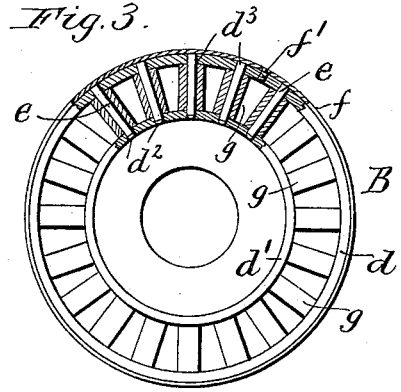
Fig. 2. Fig. 3.
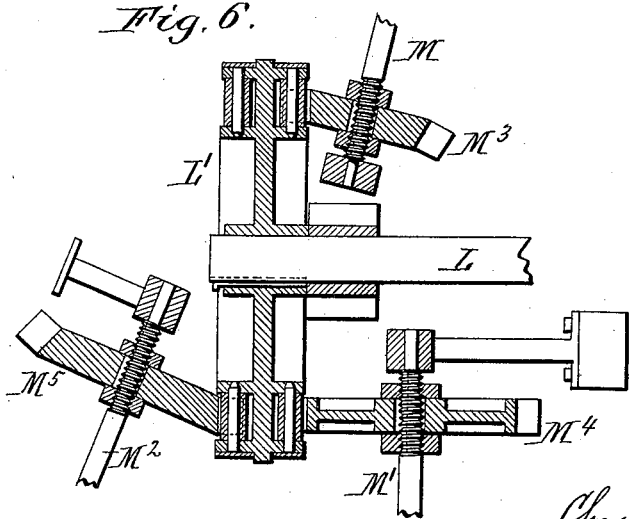
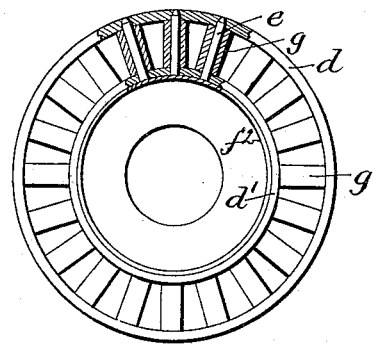
Fig. 6. Fig. 5.
Fig. 4.
Witnesses:
Henry L. Dick.
Chas. F. Burkhart.
Chas. A. Hennicke Inventor.
By Wilhelm Bonner
Attorneys.

UNITED STATES PATENT OFFICE.

CHARLES A. HENNICKE, OF BUFFALO, NEW YORK.

GEARING.

SPECIFICATION forming part of Letters Patent No. 614,548, dated November 22, 1898.

Application filed April 13, 1898. Serial No. 677,448. (No model.)

*To all whom it may concern:*

Be it known that I, CHARLES A. HENNICKE, a citizen of the United States, residing at Buffalo, in the county of Erie and State of New York, have invented a new and useful Improvement in Gearing, of which the following is a specification.

This invention relates to an improved gearing which is more especially designed for bicycles and other velocipedes, but which is generally useful for transmitting motion from one shaft to another.

The object of my invention is the construction of a noiseless easy-running gearing which can be cheaply produced and which permits a ready renewal of the teeth or cogs when the same are worn out, thus avoiding the necessity of replacing the entire wheel.

In the accompanying drawings, Figure 1 is a fragmentary side elevation of a bicycle provided with my improved gearing. Fig. 2 is a horizontal section of the portions of the gearing connected with the crank-shaft. Fig. 3 is a face view, partly in section, of my improved roller-gear. Fig. 4 is an enlarged cross-section of one of the rollers and its journal-pin. Fig. 5 is a view similar to Fig. 3, showing a modified construction of the improvement. Fig. 6 is a sectional view showing a number of shafts driven from a main shaft by my improved gearing.

Like letters of reference refer to like parts in the several figures.

A is the crank-shaft hanger of a bicycle, and A' the crank-shaft, supported therein by suitable ball-bearings.

$A^2$ is the axle of the rear wheel, and $A^3$ is a gear-wheel secured to the hub of the rear wheel.

B is a large gear-wheel mounted on the crank-shaft. Motion is transmitted from this large gear-wheel to the smaller gear-wheel on the rear-wheel hub by a longitudinal shaft C, having gear-pinions C' $C^2$ meshing with the gear-wheels $A^3$ and B. These last-mentioned gear-wheels are substantially similar in construction, and a description of the front wheel B will therefore apply also to the rear wheel $A^3$. The wheel B is provided on its inner flat side with an inwardly-extending marginal flange or ring $d$ and with a similar flange or ring $d'$, arranged concentrically within the outer flange $d$ and separated therefrom by an intervening annular space.

$e$ represents an annular row of equidistant pins extending radially across the space between the inner and outer flanges $d$ $d'$ and removably seated at their inner ends in sockets or bearings $d^2$, formed in the inner flange, and at their outer ends in openings $d^3$, formed in the outer flange and arranged in radial alinement with said sockets. The pin-sockets in the inner flange $d'$ are conical or tapered toward the axis of the wheel, so as to hold the pins against inward displacement, while the pin-openings in the outer flange extend through this flange, so that the pins can be inserted and removed through the same. The pins are confined in their openings and sockets by a band or ring $f$, which snugly encircles the outer flange, so as to close the outer ends of the pin-openings, and which is secured to said flange by one or more screws $f'$. The pins may constitute the teeth or cogs of the gear-wheel with which the teeth of the pinion C' mesh; but they are preferably surrounded by sleeves or antifriction-rollers $g$, which are free to turn upon the pins and are confined between the inner and outer flanges $d$ $d'$ of the wheel, the pins being cylindrical, so as to form journals for the rollers. In order to lubricate these rollers, each of the pins $e$ is provided with a longitudinal groove $e'$, extending inwardly from its outer end and adapted to be filled with plumbago or other lubricant. This improved gear-wheel operates almost noiselessly and with a minimum percentage of friction, rendering its use especially advantageous in a chainless driving-gear for bicycles and other velocipedes. When the roller-teeth of the wheel are worn out, they can be readily replaced by new ones by simply detaching the retaining-band $f$ from the wheel, removing the defective rollers and pins and inserting new ones, and then again replacing the retaining-band. The contracted inner ends of the pin-sockets $d^2$ extend through the inner flange $d'$, so that the inner ends of the pins can be struck by a suitable tool for driving them out of their openings in case they should bind therein.

The gear-wheel $A^3$ on the hub of the rear wheel is constructed in all respects like the wheel just described, the only difference being that the flanges $d$ $d'$ of the rear wheel face outwardly, while those of the front wheel face inwardly.

When the angle of the pinion $C^2$ with reference to the gear-wheel B deviates more or less from a right angle, the teeth of the pinion are offset sufficiently to bring them at right angles to the rollers of the gear-wheel, as shown in Fig. 2, so as to obtain the best results. The angle of the pinion-shaft can thus be changed without requiring any variation in the construction or arrangement of the rollers of the gear-wheel, which is an important advantage.

The longitudinal shaft C is journaled in suitable bearings arranged on the rear side of the crank-shaft hanger and the meeting portions of the rear-wheel forks. In the construction shown in the drawings the hanger is provided on its rear side with a socket $h$, in which a ball-cup $h'$ is confined, and the shaft is provided at its front end with a cone $i$, between which and said cup a row of balls is interposed. The gear-pinion $C^2$ is preferably made adjustable on its shaft for taking up wear of its own teeth and the roller-teeth of the gear-wheel, the intermeshing teeth being brought more closely together by moving the pinion toward the axis of the large wheel, so as to shift the teeth of the pinion farther into the tapering spaces between the inwardly-converging rollers of the large wheel. For this purpose the hub of the pinion is provided with a smooth bore for the passage of the shaft, and the same is adjustably confined between two nuts $j\,j'$, which engage with an external screw-thread of the shaft, as shown. The pinion, while capable of being adjusted lengthwise on the shaft by means of the nuts $j\,j'$, is compelled to turn with the shaft by a key or spline $k$, engaging with keyways formed in the bore of the pinion and the surface of the shaft, as shown in Fig. 2. This key is as long as the bore of the pinion and slides with the pinion in adjusting the same. The pinion is adjusted in an obvious manner by turning the nuts $j\,j'$ in one or the other direction, the nuts serving at the same time as jam-nuts, which firmly clamp the pinion upon the shaft. The rear pinion $C'$ may be adjustably mounted on the shaft in the same manner.

When my improved gearing is used on a velocipede, the same may be inclosed by a suitable casing.

If desired, the arrangement of the pin sockets and openings may be reversed, as shown in Fig. 5, the sockets being formed in the outer flange and the openings in the inner flange. In this case the retaining-band is arranged to bear against the inner face of the inner flange, so as to cover the pin-openings and keep the pins in place.

My improved gearing, like ordinary gearing, is also useful for driving machinery of various kinds.

In Fig. 6 are shown a number of shafts connected with a main shaft by my improved gearing. L is the main shaft, carrying one of my improved roller gear-wheels L', the roller-teeth being duplicated on opposite sides of the wheel to form a duplex wheel. M M' M² are shafts arranged at various angles to the main shaft and carrying gear-wheels M³ M⁴ M⁵, which mesh with the wheel of the main shaft. When the pinion-shaft is placed at an angle to the main or driving shaft other than a right angle, the teeth of the pinions are beveled or recessed obliquely in their sides to form a proper contact with the roller-teeth with which they mesh.

I claim as my invention—

1. A gear-wheel provided on one of its flat sides with concentric rings or flanges, one of which is provided with seats or sockets and the other with openings arranged opposite said sockets, pins extending across the space between said flanges and arranged in the opposing sockets and openings thereof, and a retaining ring or band extending across said openings for confining said pins therein, substantially as set forth.

2. A gear-wheel provided on one of its flat sides with concentric rings or flanges, the inner one of which is provided with seats or sockets and the outer one with openings arranged opposite said sockets, pins extending across the space between said flanges and arranged in the sockets and openings thereof, rollers mounted on said pins, and a retaining-band surrounding said outer flange and closing the openings thereof, substantially as set forth.

Witness my hand this 6th day of April, 1898.

CHARLES A. HENNICKE.

Witnesses:
CARL F. GEYER,
JNO. J. BONNER.